United States Patent
Ho et al.

(10) Patent No.: US 9,911,005 B2
(45) Date of Patent: Mar. 6, 2018

(54) PROTECTING SEARCH PRIVACY USING POLICY-BASED SEARCH TERMS

(71) Applicant: INTERNATIONAL BUSINESS MACHINES CORPORATION, Armonk, NY (US)

(72) Inventors: Ivy Ho, Thornhill (CA); Diana Lau, Richmond Hill (CA); Sik Nin Ivan Yue, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/073,692

(22) Filed: Mar. 18, 2016

(65) Prior Publication Data

US 2017/0270316 A1     Sep. 21, 2017

(51) Int. Cl.
*G06F 21/62*     (2013.01)
*G06F 17/30*     (2006.01)
*G06F 17/27*     (2006.01)
*H04L 29/06*     (2006.01)

(52) U.S. Cl.
CPC ...... *G06F 21/6263* (2013.01); *G06F 17/2705* (2013.01); *G06F 17/30867* (2013.01); *G06F 21/6245* (2013.01); *H04L 63/0428* (2013.01)

(58) Field of Classification Search
CPC .............................. G06F 17/27–17/272; G06F 17/30861–17/30867; G06F 21/6245–21/6263; H04L 63/04; H04L 63/0428; H04L 67/02–67/025
See application file for complete search history.

(56) References Cited

U.S. PATENT DOCUMENTS

| | | |
|---|---|---|
| 5,490,994 A | 2/1996 | Soedjak |
| 8,261,069 B2 | 9/2012 | Bellovin et al. |
| 8,281,392 B2 | 10/2012 | Sinha et al. |
| 8,473,503 B2 | 6/2013 | Cheng et al. |
| 8,555,250 B2 | 10/2013 | Fanning et al. |
| 8,601,024 B2 | 12/2013 | Kenthapadi et al. |
| 8,725,714 B2 | 5/2014 | Ai |

(Continued)

OTHER PUBLICATIONS

Avidan et al., "Privacy Preserving Pattern Classification", ICIP 2008, pp. 1684-1687.

(Continued)

*Primary Examiner* — Kevin Bechtel
(74) *Attorney, Agent, or Firm* — Teddi E. Maranzano (57) ABSTRACT

A processor-implemented method for policy-based search privacy is provided, including a search privacy module and one or more privacy policy configurations. The privacy policy configurations include at least one semantic domain, at least one semantic scope, at least one semantic domain database, and at least one lexical database. A web search is intercepted. The search terms in the web search are compared to the semantic domain in the privacy policy configuration. If a match is found, a query is submitted to the semantic domain database to retrieve keywords within a number of levels of the semantic domain, as specified by the semantic scope. The search privacy module generates web searches that are semantically similar to the desired web search, using the retrieved keywords. These generated web searches are submitted to the search engine along with the desired web search.

9 Claims, 3 Drawing Sheets

(56) References Cited

U.S. PATENT DOCUMENTS

| | | | | |
|---|---|---|---|---|
| 2009/0037457 | A1* | 2/2009 | Musgrove | G06F 17/30731 |
| 2011/0113038 | A1 | 5/2011 | Corbin et al. | |
| 2011/0258250 | A1* | 10/2011 | Cremin | G06F 17/30905 709/203 |
| 2014/0007250 | A1 | 1/2014 | Stefanov et al. | |
| 2014/0026221 | A1* | 1/2014 | B'Far | G06F 21/50 726/26 |
| 2015/0058309 | A1* | 2/2015 | Cho | G06F 17/30867 707/706 |

OTHER PUBLICATIONS

DuckDuckGo, "Take back your privacy!", Switch to the search engine that doesn't track you, About DuckDuckGo, https://duckduckgo.com/, Accessed on Dec. 24, 2015, 5 pages.

Ixquick, "Ixquick Protects Your Privacy!", About Us—How we're different, https://www.ixquick.com/eng/aboutixquick/, Accessed on Dec. 24, 2015, 2 pages.

Kodeswaran et al., "Applying Differential Privacy to Search Queries in a Policy Based Interactive Framework", PAVLAD, Nov. 6, 2009, Hong Kong, China, 8 pages.

Pang et al., "Embellishing Text Search Queries to Protect User Privacy", VLDB, Sep. 13-17, 2010, Singapore, 10 pages.

Peddinti et al., "On the Privacy of Web Search Based on Query Obfuscation: A Case Study of TrackMeNot", PETS 2010, vol. 6205 of the series Lecture Notes in Computer Science, 18 pages.

Howe et al., "TrackMeNot", https://cs.nyu.edu/trackmenot/, Accessed on Dec. 28, 2015, pp. 1-5.

Vaughan, "Google to Encrypt ALL Keyword Searches: Say Goodbye to Keyword Data", Sep. 24, 2013, http://blog.hubspot.com/marketing/google-encrypting-all-searches-nj, pp. 1-9.

Princeton University, WordNet, A lexical database for English, "What is WordNet?", http://wordnet.princeton.edu/, Accessed on Dec. 24, 2015, pp. 1-3.

Fondazione Bruno Kessler, WordNet Domains, WordNet Domains Hierarchy, http://wndomains.fbk.eu/hierarchy.html, HLT Research Unit, Accessed on Dec. 24, 2015, pp. 1-5.

Ye et al., "Noise Injection for Search Privacy Protection", 2009 International Conference on Computational Science and Engineering, Copyright 2009 IEEE, pp. 1-8.

\* cited by examiner

PROTECTING SEARCH PRIVACY USING POLICY-BASED SEARCH TERMS

BACKGROUND

This disclosure relates generally to the field of computer security, and more particularly to search privacy using policy-based search terms.

Users who engage in web (i.e., internet) browsing may want their activities to remain private, for example, when exploring employment opportunities, or to avoid unwanted advertisements. While major web browser providers may offer a private browsing option, the web site hosting companies can collect search terms and IP addresses, thereby still tracking user activities. The search engine providers can perform analytics on the collected user information, the results of which may disclose activity patterns and defeat the private browsing option.

Providing a policy-based web search ability may improve anonymity and privacy while web browsing, and may contribute to users' security because key demographic information, such as geographic location can be kept private.

SUMMARY

According to one embodiment a processor-implemented method for policy-based search privacy is provided. The method includes receiving, by a search privacy module, a privacy policy configuration, whereby the privacy policy configurations includes at least one semantic domain, at least one semantic scope, at least one semantic domain database, and at least one lexical database. The method intercepts, by the search privacy module, a desired web search, whereby the desired web search is intercepted following its entry into a web browser and is not submitted to a search engine. In response to intercepting the desired web search, the method compares the intercepted desired web search with the at least one semantic domain in the privacy policy configuration. Based on the comparing, the method submits the desired web search and zero or more additional web searches to the search engine.

According to another embodiment, a computer program product for policy-based search privacy is provided. The computer program product includes a search privacy module embodied on a computer readable storage medium. The search privacy module includes program instructions executable by a processor to receive a privacy policy configuration, whereby the privacy policy configuration includes at least one semantic domain, at least one semantic scope, at least one semantic domain database, and at least one lexical database. The computer program product includes program instructions to intercept a desired web search, whereby the desired web search is intercepted following its entry into a web browser and is not submitted to a search engine. In response to intercepting the desired web search, program instructions compare the intercepted desired web search with the at least one semantic domain in the privacy policy configuration. Based on the comparing, program instructions submit the desired web search and zero or more additional web searches to the search engine.

According to another embodiment, a computer system for policy-based search privacy is provided. The computer system includes one or more processors, one or more computer-readable storage devices, and a plurality of program instructions stored on at least one of the one or more storage devices for execution by at least one of the one or more processors. The plurality of program instructions include instructions to receive a privacy policy configuration, whereby the privacy policy configuration includes at least one semantic domain, at least one semantic scope, at least one semantic domain database, and at least one lexical database. The computer system includes program instructions to intercept a desired web search, whereby the desired web search is intercepted following its entry into a web browser and is not submitted to a search engine. In response to intercepting the desired web search, program instructions compare the intercepted desired web search with the at least one semantic domain in the privacy policy configuration. Based on the comparing, program instructions submit the desired web search and zero or more additional web searches to the search engine.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of data replication, and more particularly to data replication recovery.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
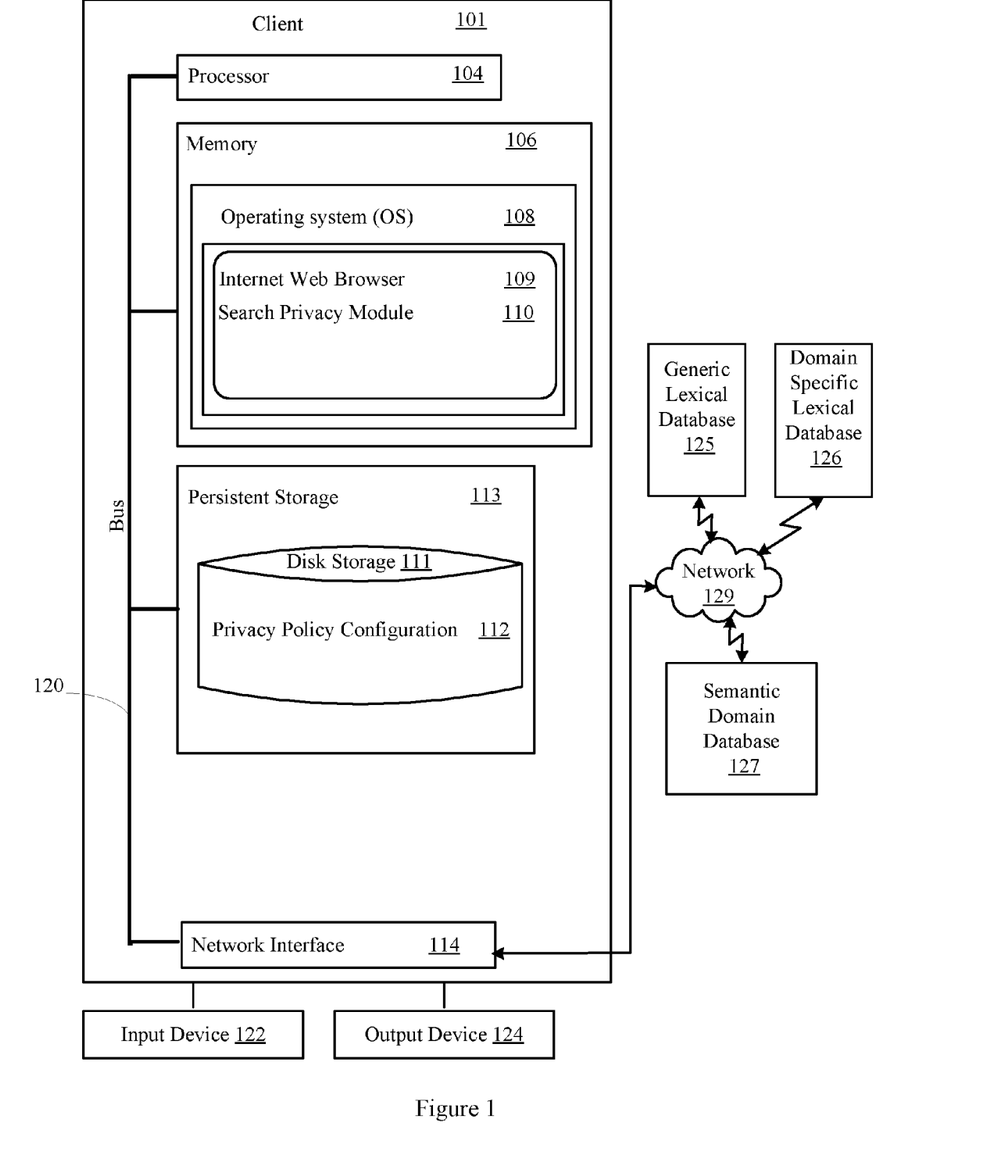
FIG. 1 illustrates an exemplary computer system environment operable for various embodiments of the disclosure.

FIG. 1 illustrates a block diagram of an exemplary data processing system operable for various embodiments of the disclosure. The data processing system includes a client 101 computer through which an end user accesses an internet web browser 109. The client 101 may connect to other client computers and server computers via a network 129. In this context a client 101 is a computing device that requests and receives services from other network-connected computing devices, such as internet search engines being accessed through an internet web browser 109. The client 101 includes tablets, laptops, smart phones, and similar devices capable of accessing an internet web browser 109. Other servers hosting an instance of a generic lexical database 125, a domain specific lexical database 126, and semantic domains 127 are shown, although multiple instances of each is possible. The network 129 may include connections, such as wire, wireless communication links, or fiber optic cables.

The client 101 includes a processor unit 104 that executes instructions for software, for example the internet web browser 109 and search privacy module 110 (discussed in further detail with respect to FIG. 2) that may be loaded into memory 106. The processor unit 104 may be a set of one or more processors or may be a multi-processor core, depending on the particular implementation. Further, the processor unit 104 is connected, via a bus 120, to memory 106, a network interface device 114, disk storage 111, persistent storage 113, and input device 122, and an output device 124.

Figure 2:
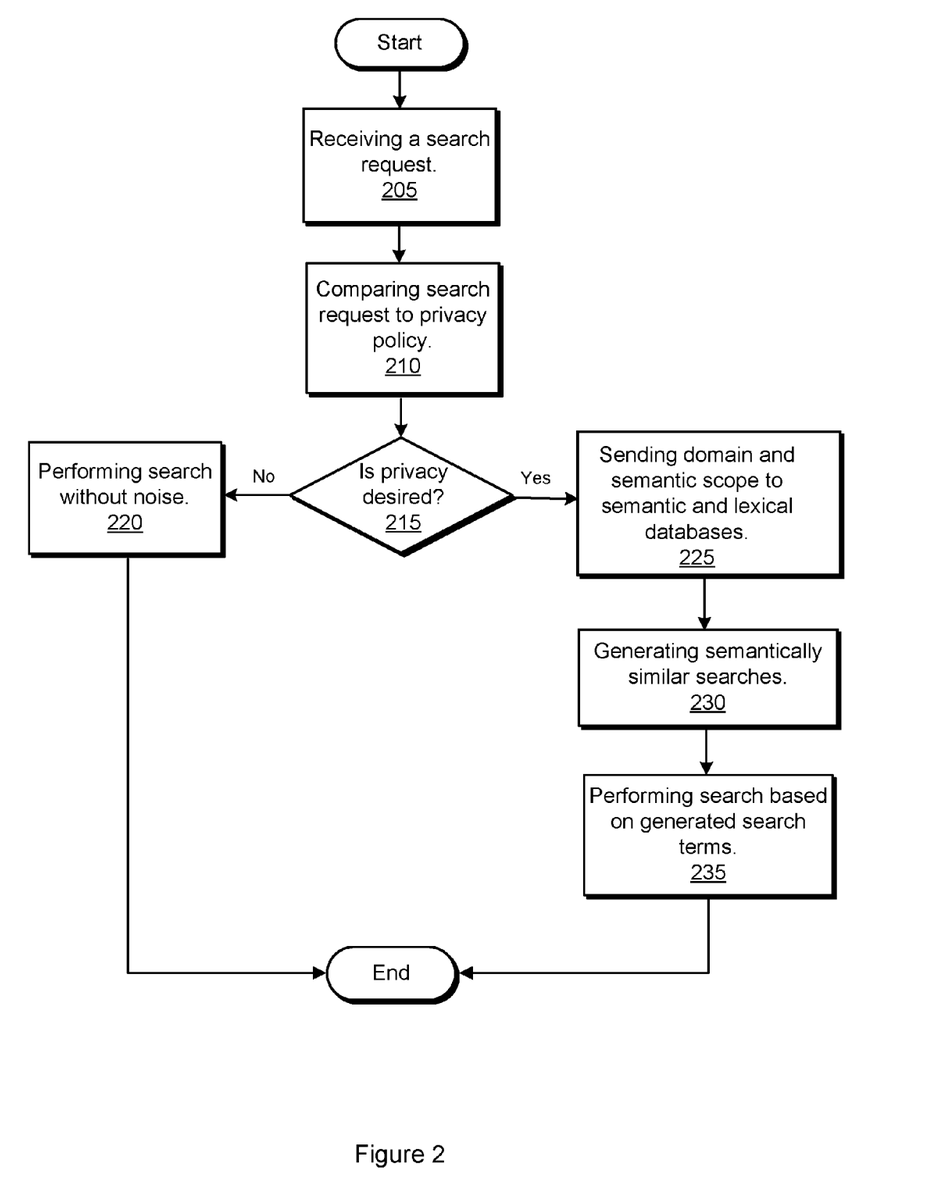
FIG. 2 illustrates an algorithm for protecting search privacy using policy-based search terms, according to various embodiments of the disclosure.

The client 101 is generally under the control of an operating system 108 that includes program instructions to support the functions disclosed with reference to FIG. 2. The processor 104 is included to be representative of several implementation dependent architectures, such as a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 114 may be any type of network communications device allowing the client 101 to communicate with other computers via a network 129.

Persistent storage 113 may be any device or hardware that is capable of storing information, such as an OS 108, and program instructions, including those providing the internet web browser 109 and search privacy module 110. Persistent storage 113 may take various forms depending on the particular implementation. For example, persistent storage 113 may be disk storage 111, a flash memory, optical disk, magnetic tape, cloud storage devices, or some combination of the above.

The input device 122 may be any device for providing input to the client 101. For example, a keyboard and/or a mouse may be used. The output device 124 may be any device for providing output to a user of the client 101. Although shown separately from the input device 122, the output device 124 and input device 122 may be combined, as in a display screen with an integrated touch-screen.

The search privacy module 110 generates additional searches using unrelated search terms (i.e., noise) that will be sent to the search engine along with the user's desired web search. The injected noise disguises the desired web search so that the search engine provider cannot determine the user's true search among all the submitted searches, thereby providing improved privacy for the user. The noise is generated based on the privacy policy configuration 112 definitions, using one or more generic lexical databases 125, domain specific lexical databases 126, and semantic domains 127. The search privacy module 110 can be provided as a client side browser plugin, as a separate software module that is not a browser plug-in, as an add-on, or may reside on a server other than the client 101, for example, on a centrally managed server (not shown), to which many users can connect. The user policy-based search privacy can be implemented on a per-browser basis when there are multiple web browsers installed on a computing device. For example, a user may implement policy-based search privacy for Firefox® (Firefox is a registered trademark of the Mozilla Foundation), but not for Internet Explorer® (Internet Explorer is a registered trademark of Microsoft Corporation in the United States and/or other countries), where the user has both web browsers installed on the same computing device. Additionally, the user may define different privacy policy configurations 112 for each of the user's installed web browsers, or the installed web browsers may share the same privacy policy configuration 112.

The search privacy module 110 uses the user-defined privacy policy configuration 112 to determine which semantic domains, which can be referred to as areas of human knowledge, require noise injection. The user can create the privacy policy configuration 112 as a text file using a standard text editor. Alternatively, a browser interface, menu, or similar input tool, can accept user input. The privacy policy configuration 112 can be stored as text, html, or other format that the search privacy module 110 can interpret. The presence of a semantic domain in the privacy policy configuration 112 indicates that the user desires additional search privacy for the semantic domain. The semantic domains are organized in various hierarchies. For example, computer science and engineering are within the hierarchy of the applied science domain. Various semantic domain databases 127, such as WordNet, are publically available. An enterprise can develop and add custom databases, such as the generic lexical database 125 and the domain specific lexical database 126. The customer databases can be extensions to existing databases such as WordNet, or the customer databases can stand alone as new databases. In an embodiment, one or more of the custom databases can be set as a first filter, for example, for selecting which semantic domain database 127 and/or lexical database 125 and 126 is most likely to match the user's submitted search term. In addition to containing the semantic domains, the privacy policy configuration 112 can specify a different search order of the various lexical databases for each of the semantic domains. The privacy policy configuration 112 also includes an identifier for the search privacy module 110 to refine how close the generated search terms should be compared to the desired search term, i.e. semantic scope. For example, a semantic scope of "3" may return generated search terms that are within three hierarchy levels of the desired search term. As shown in FIG. 1, the various lexical databases can be located on the same or different computers. The privacy policy configuration 112 can reside on the client 101, or may reside on a centrally managed server (not shown) along with the privacy policy configurations 112 of other users. Storing the privacy policy configurations 112 on a centrally managed server can provide increased security. For example in a research environment, the centrally managed server may be protected by additional firewalls, anti-virus, and similar security. An administrator may control a user's access and ability to modify his privacy policy configuration 112 to ensure that highly sensitive information is not accidently revealed through web (i.e., internet) browsing. Additionally, an enterprise-wide default privacy policy configuration 112 can be assigned to a user.

As will be discussed with reference to FIG. 3, the client 101 may include internal components 800 and external components 900.

Referring now to FIG. 2, an algorithm for protecting search privacy using policy-based search terms is illustrated. At 205, the user submits a search from a web browser, and the search privacy module 110 (FIG. 1) intercepts the search. The search can include keywords, phrases, or pattern matching characters, such as asterisk and question mark, for searching on partial words.

At 210, the search privacy module 110 (FIG. 1) parses the intercepted search to isolate and identify the search terms. The privacy policy module 110 (FIG. 1) searches the privacy policy configuration 112 (FIG. 1), using known text analytics, to determine whether the privacy policy configuration 112 includes any or all of the identified search terms.

If at 215, the search privacy module 110 (FIG. 1) does not locate matching search terms in the privacy policy configuration 112 (FIG. 1), the search privacy module 110 (FIG. 1) submits the user's unaltered desired search to the user's search engine. For example, if the user's search relates to the "sports" domain, and the privacy policy configuration 112 (FIG. 1) does not include the "sports" domain, then the search privacy module 110 (FIG. 1) takes no action to inject noise since the user does not desire additional search privacy.

If at 215, the search privacy module 110 (FIG. 1) locates matching search terms in the privacy policy configuration 112 (FIG. 1), then at 225 the search privacy module 110 (FIG. 1) generates and sends one or more queries to the semantic and/or lexical databases (125, 126, 127 of FIG. 1) that are associated with the semantic domain of the search terms. The query also includes the identifier to specify the semantic scope of the search. The search privacy module 110 (FIG. 1) formats the query according to the application programming interface (API) provided by each semantic and/or lexical databases (125, 126, 127 of FIG. 1).

At 230, the semantic and/or lexical databases (125, 126, 127 of FIG. 1) return keywords that are within the semantic scope of the semantic domain. The search privacy module 110 (FIG. 1) generates browser searches that are semantically similar to the user's desired web search, using the returned keywords. In natural language processing, semantic similarity is a metric defined over a set of terms, where the distance between them is based on the likeness of their meaning. One or more browser searches may be generated, depending upon how many returned keywords and semantic domains are involved. These generated browser searches are referred to as the injected noise.

At 235, the search privacy module 110 (FIG. 1) submits the generated browser searches and the user's desired web search to the search engine. The user's desired web search remains unaltered. Because of the breadth and variety of the subjects of the browser searches, the search engine is not likely to track or identify the user.

Figure 3:
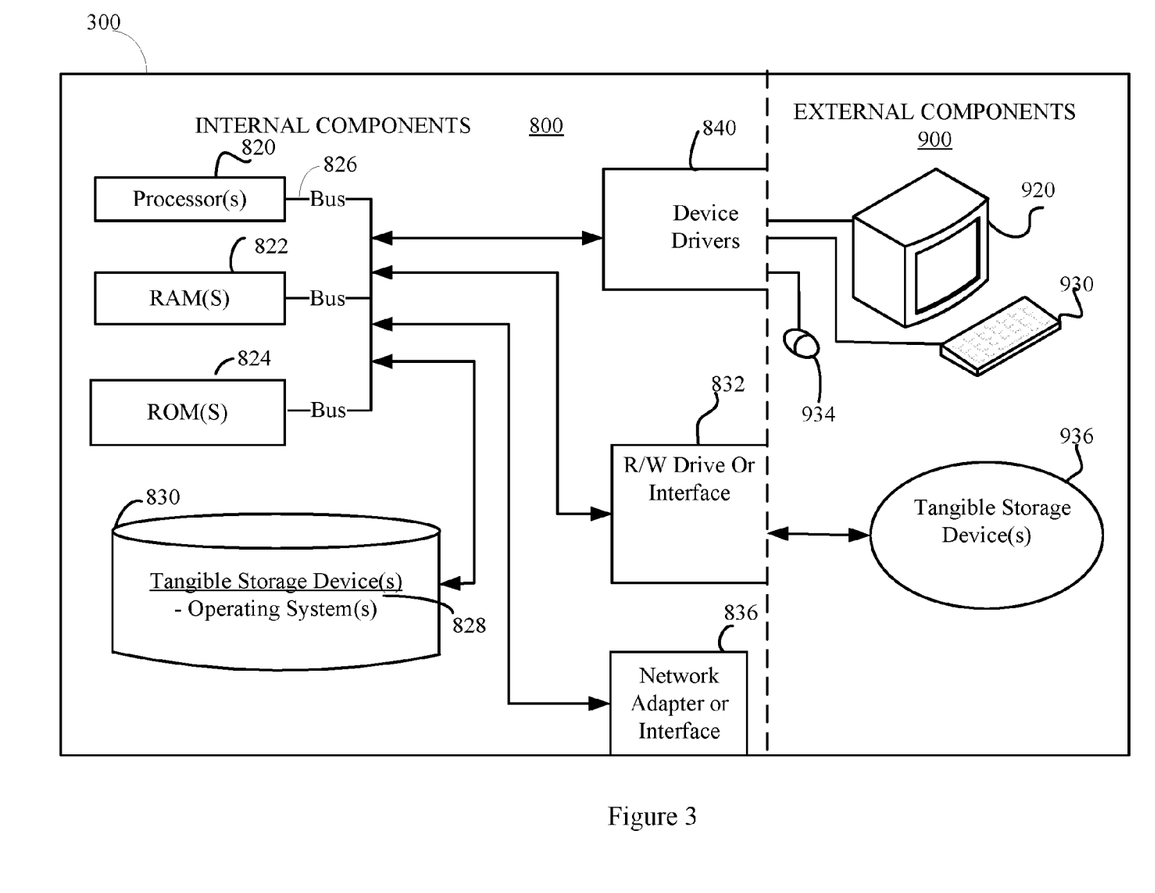
FIG. 3 is a schematic block diagram of hardware and software of the computer environment according to an embodiment of the process of FIG. 2.

FIG. 3 illustrates an exemplary computing device 300 applicable for executing the algorithm of FIG. 2. Computing device 300 may include respective sets of internal components 800 and external components 900 that together may provide an environment for a software application, such as the data replication recoverer. Each of the sets of internal components 800 includes one or more processors 820; one or more computer-readable RAMs 822; one or more computer-readable ROMs 824 on one or more buses 826; one or more operating systems 828; one or more software applications executing the method illustrated in FIG. 2; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective tangible storage device 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A processor-implemented method for policy-based search privacy comprising:
   receiving, by a search privacy module, a privacy policy configuration, wherein the privacy policy configurations includes at least one semantic domain, at least one semantic scope, at least one semantic domain database, and at least one lexical database, and wherein the privacy policy configuration is set on a per-browser basis in a multi-browser environment;
   intercepting, by the search privacy module, a desired web search, wherein the desired web search is intercepted following its entry into a web browser and is not submitted to a search engine;
   in response to intercepting the desired web search, comparing the intercepted desired web search with the at least one semantic domain in the privacy policy configuration;
   parsing the intercepted desired web search to identify search terms, wherein the identified search terms include phrases, keywords, and pattern matched partial keywords;
   matching the identified search terms with the at least one semantic domain in the privacy policy configuration;
   in response to matching at least one identified search term, generating and sending, by the search privacy module, one or more queries to at least one semantic domain database and at least one lexical database, wherein each of the one or more generated queries is within the semantic scope for the at least one identified term, and wherein the semantic scope specifies a number of hierarchy levels beginning at the semantic domain, within which the received results are generated; and
   in response to receiving results from the one or more generated sent queries, creating a semantically similar web search for each of the received results, and submitting, to the search engine, each of the semantically similar web searches along with the unaltered desired web search.

2. The method of claim 1, wherein either the privacy policy configuration is defined for each web browser or a different privacy policy configuration is defined for each web browser, wherein multiple web browsers are installed on a computing device.

3. The method of claim 1, wherein the desired web search is submitted to the search engine unaltered, based on the identified search terms not being matched in the privacy policy configuration.

4. A computer program product for policy-based search privacy comprising:
   a computer readable storage device having program instructions embodied therewith, wherein the computer readable storage device is not a transitory signal per se, the program instructions executable by a processor to cause the processor to perform a method comprising:
   receiving a privacy policy configuration, wherein the privacy policy configuration includes at least one semantic domain, at least one semantic scope, at least one semantic domain database, and at least one lexical database, and wherein the privacy policy configuration is set on a per-browser basis in a multi-browser environment;
   intercepting a desired web search, wherein the desired web search is intercepted following its entry into a web browser and is not submitted to a search engine;
   in response to intercepting the desired web search, comparing the intercepted desired web search with the at least one semantic domain in the privacy policy configuration;
   parsing the intercepted desired web search to identify search terms, wherein the identified search terms include phrases, keywords, and pattern matched partial keywords;
   matching the identified search terms with the at least one semantic domain in the privacy policy configuration; and
   in response to matching at least one identified search term, generating and sending, by the search privacy module, one or more queries to at least one semantic domain database and at least one lexical database, wherein each of the one or more generated queries is within the semantic scope for the at least one identified term, and wherein the semantic scope specifies a number of hierarchy levels beginning at the semantic domain, within which the received results are generated; and
   in response to receiving results from the one or more generated sent queries, creating a semantically similar web search for each of the received results, and submitting, to the search engine, each of the semantically similar web searches along with the unaltered desired web search.

5. The computer program product of claim 4, wherein either the privacy policy configuration is defined for each web browser or a different privacy policy configuration is defined for each web browser, wherein multiple web browsers are installed on a computing device.

6. The computer program product of claim 4, wherein the desired web search is submitted to the search engine unaltered, based on the identified search terms not being matched in the privacy policy configuration.

7. A computer system for policy-based search privacy comprising:
   one or more processors, one or more computer-readable storage devices, and a plurality of program instructions stored on at least one of the one or more storage devices for execution by at least one of the one or more processors to cause the one or more processors to perform a method comprising:
   receiving a privacy policy configuration, wherein the privacy policy configuration includes at least one semantic domain, at least one semantic scope, at least one semantic domain database, and at least one lexical database, and wherein the privacy policy configuration is set on a per-browser basis in a multi-browser environment;
   intercepting a desired web search, wherein the desired web search is intercepted following its entry into a web browser and is not submitted to a search engine;
   in response to intercepting the desired web search, comparing the intercepted desired web search with the at least one semantic domain in the privacy policy configuration;
   parsing the intercepted desired web search to identify search terms, wherein the identified search terms include phrases, keywords, and pattern matched partial keywords;
   matching the identified search terms with the at least one semantic domain in the privacy policy configuration; and
   in response to matching at least one identified search term, generating and sending, by the search privacy module, one or more queries to at least one semantic domain database and at least one lexical database, wherein each of the one or more generated queries includes at least one semantic domain, at least one semantic domain database, and at least one lexical database, wherein each of the one or more generated queries is within the semantic scope for the at least one identified term, and wherein the semantic scope specifies a number of hierarchy levels beginning at the semantic domain, within which the received results are generated; and in response to receiving results from the one or more generated sent queries, creating a semantically similar web search for each of the received results, and submitting, to the search engine, each of the semantically similar web searches along with the unaltered desired web search.

8. The computer system of claim 7, wherein either the privacy policy configuration is defined for each web browser or a different privacy policy configuration is defined for each web browser, wherein multiple web browsers are installed on a computing device.

9. The computer system of claim 7, wherein the desired web search is submitted to the search engine unaltered, based on the identified search terms not being matched in the privacy policy configuration.

* * * * *